(12) United States Patent
An

(10) Patent No.: US 10,416,516 B2
(45) Date of Patent: Sep. 17, 2019

(54) LIQUID CRYSTAL DISPLAY PANEL AND LIQUID CRYSTAL DISPLAY DEVICE

(71) Applicant: Shenzhen China Star Optoelectronics Technology Co., Ltd., Shenzhen, Guangdong (CN)

(72) Inventor: Liyang An, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 49 days.

(21) Appl. No.: 15/570,323

(22) PCT Filed: Jul. 26, 2017

(86) PCT No.: PCT/CN2017/094412
§ 371 (c)(1),
(2) Date: Oct. 27, 2017

(87) PCT Pub. No.: WO2018/232829
PCT Pub. Date: Dec. 27, 2018

(65) Prior Publication Data
US 2018/0364533 A1 Dec. 20, 2018

(30) Foreign Application Priority Data

Jun. 20, 2017 (CN) .......................... 2017 1 0471058

(51) Int. Cl.
*G02F 1/1362* (2006.01)
*G02F 1/1335* (2006.01)
*G02F 1/1368* (2006.01)

(52) U.S. Cl.
CPC ...... *G02F 1/136286* (2013.01); *G02F 1/1368* (2013.01); *G02F 1/133512* (2013.01);
(Continued)

(58) Field of Classification Search
CPC ............ G02F 1/136286; G02F 1/1368; G02F 1/133514; G02F 1/133512; G02F 2201/123; G02F 2201/40
See application file for complete search history.

(56) References Cited

U.S. PATENT DOCUMENTS

2007/0052899 A1* 3/2007 Lin .................. G02F 1/134363
349/141
2008/0002123 A1* 1/2008 Kim ..................... G02F 1/1362
349/139

(Continued)

FOREIGN PATENT DOCUMENTS

| CN | 102033367 A | 4/2011 |
|----|-------------|--------|
| CN | 102854674 A | 1/2013 |

(Continued)

*Primary Examiner* — Shan Liu
(74) *Attorney, Agent, or Firm* — Andrew C. Cheng

(57) ABSTRACT

A liquid crystal display panel includes an array substrate, a color filter substrate, and a liquid crystal layer interposed therebetween. The array substrate includes scan lines and data lines insulated from the scan lines and arranged mutually perpendicular to each other to define pixels that are arranged in an array. Each pixel includes a thin-film transistor and a pixel electrode connected to the thin-film transistor. The thin-film transistor is connected to one of the data lines and one of the scan lines corresponding thereto. A separation zone is formed between adjacent ones of the pixel electrodes. The thin-film transistor and the scan line are arranged in the separation zone. The pixels further comprise a transparent wiring line arranged along an outer circumference of the scan line. The transparent wiring line is supplied with an electrical voltage that is a common voltage of the array substrate.

12 Claims, 2 Drawing Sheets

(52) U.S. Cl.
CPC .. *G02F 1/133514* (2013.01); *G02F 1/136209* (2013.01); *G02F 2001/136218* (2013.01); *G02F 2001/136295* (2013.01); *G02F 2201/123* (2013.01); *G02F 2201/40* (2013.01)

(56) References Cited

U.S. PATENT DOCUMENTS

2012/0050643 A1\* 3/2012 Li .......................... H01L 27/12
349/61
2018/0081245 A1\* 3/2018 Xiao ................ G02F 1/133512

FOREIGN PATENT DOCUMENTS

| CN | 104238207 A | 12/2014 |
| CN | 105446029 A | 3/2016 |
| CN | 106019730 A | 10/2016 |
| CN | 106647058 A | 5/2017 |
| WO | 2011158424 A1 | 12/2011 |

\* cited by examiner

LIQUID CRYSTAL DISPLAY PANEL AND LIQUID CRYSTAL DISPLAY DEVICE

CROSS REFERENCE TO RELATED APPLICATIONS

This application claims the priority of Chinese Patent Application No. 201710471058.8 filed on Jun. 20, 2017, titled "Liquid Crystal Display Panel and Liquid Crystal Display Device", the disclosure of which is incorporated herein by reference in its entirety.

BACKGROUND OF THE INVENTION

1. Field of the Invention

The present invention relates to the field of liquid crystal display technology, and more particularly to a liquid crystal display panel and a liquid crystal display device.

2. The Related Arts

The aperture ratio of liquid crystal display panels is an important specification of the liquid crystal display panels and it directly determines the maximum level of brightness that a panel may reach. It is common practice to make the aperture ratio as large as possible in the initial stage of product design, because a large aperture ratio indicates a high level of brightness. When product specification (specification of brightness) is finally set, a large aspect ratio indicates that appropriate reduction of backlighting brightness is possible so that power consumption of the backlighting and the consumption of target material can be reduced to lower down the cost.

Thus, an increase of aperture ratio has been constantly pursued in the liquid crystal display industry. This imposes demands on people involved in the liquid crystal industry to better designs, improve structures improved, and make reasonable arrangements among layers, and to increase the aperture ratio as much as possible provided no light leaking can be assured for a dark state of the liquid crystal panels.

SUMMARY OF THE INVENTION

The present invention provide an array substrate, which avoids the issue of reduction of the aperture ratio of a pixel area in order to improve utilization of backlighting.

The present invention provides a liquid crystal display panel, which comprises an array substrate, a color filter substrate, and a liquid crystal layer interposed between the array substrate and the color filter substrate, the array substrate comprising a plurality of scan lines and a plurality of data lines that are insulated from the scan lines, the scan lines and the data lines being arranged mutually perpendicular to each other to define a plurality of pixels that are arranged in an array, each of the pixels comprising, at least, a thin-film transistor and a pixel electrode connected to the thin-film transistor, the thin-film transistor of each of the pixels being connected to one of the data lines and one of the scan lines corresponding thereto, a separation zone being formed between adjacent ones of the pixel electrodes, the thin-film transistor and the scan line being arranged in the separation zone, wherein the pixels further comprise a transparent wiring line arranged along an outer circumference of the scan line, the transparent wiring line being supplied with an electrical voltage that is a common voltage of the array substrate.

In the above liquid crystal display panel, the transparent wiring line has edges that cast projections on a plane on which the scan line is located to coincide with edges of the scan lines; and the transparent wiring line casts a projection on the plane on which the scan line is located and not coincident with the scan line.

In the above liquid crystal display panel, the color filter substrate is provided thereon with a light shielding zone corresponding to the separation zone and the light shielding zone comprises a first edge and a second edge opposite to the first edge, the first edge of the light shielding zone being arranged at a location between the transparent wiring line and one of the pixel electrodes or coincident with an edge of the transparent wiring line, the second edge of the light shielding zone being coincident with an edge of another one of the pixel electrode adjacent thereto or spaced therefrom by a predetermined distance, the light shielding zone shielding the scan line and the transparent wiring line.

In the above liquid crystal display panel, the color filter substrate is provided thereon with a light shielding zone corresponding to the separation zone and the light shielding zone comprises a first edge and a second edge opposite to the first edge, the first edge of the light shielding zone being located at an edge of the scan line, the second edge of the light shielding zone being adjacent to or spaced from the pixel electrode by a predetermined distance, the light shielding zone shielding the scan line and the thin-film transistor, the light shielding zone comprising an opening corresponding to the transparent wiring line to expose the transparent wiring line.

In the above liquid crystal display panel, the opening of the light shielding zone that corresponds to the transparent wiring line has a pattern that corresponds to a pattern of the transparent wiring line and a size of the opening is identical to a size of the transparent wiring line or slightly smaller than the size of the transparent wiring line.

In the above liquid crystal display panel, the transparent wiring line comprises two light segments and in the separation zone, the scan line is located between the two light segments of the transparent wiring line.

In the above liquid crystal display panel, the two light segments of the transparent wiring line are respectively set along two sides of the scan line, the two line segments of the transparent wiring line casting projections on the plane on which the scan line is and not coincident with the scan line, edges of the two line segments of the transparent wiring line casting projections on the plane on which the scan line is located being respectively coincident with the two sides of the scan line.

In the above liquid crystal display panel, the liquid crystal display panel comprises a display zone and a peripheral zone, and the two line segments of the transparent wiring line of same separation zone do not intersect in the display zone and the two line segments of the transparent wiring line are connected in the peripheral zone.

In the above liquid crystal display panel, the transparent wiring line and the pixel electrode are located on the same layer and are formed with the same operation process.

The present invention also provides a liquid crystal display device, which comprises a backlight module and the above liquid crystal display device. The backlight module supplies light to the liquid crystal display panel.

The present invention provides a liquid crystal display panel that comprises a transparent wiring line provided in a separation zone of an array substrate at a site thereof, which corresponds to a light shielding zone and in which a thin-film transistor is arranged, to surround a scan line of the separation zone, in the entirety thereof, and connect with the scan line, but not covering the scan line so that edges of the light shielding zone (the first edge and the second edge) are retracted to edge of metal (scan line) without shielding the pixel electrodes on two sides of the separation zone to thereby effectively increase the aperture ratio of the pixels.

BRIEF DESCRIPTION OF THE DRAWINGS

To more clearly explain the technical solution proposed in an embodiment of the present invention or that of the prior art, a brief description to the drawings that are necessary for describing the embodiment or the prior art is given as follows. It is obvious that the drawings that will be described below show only some embodiments of this application. For those having ordinary skills of the art, other illustrations may be readily available from these attached drawings without the expense of creative effort and endeavor.

DETAILED DESCRIPTION OF THE PREFERRED EMBODIMENTS

A clear and complete description will be given to technical solutions provided by embodiments of the present invention with reference to the attached drawings of the embodiments of the present invention. However, the embodiments so described are only some, but not all of the embodiments of the present invention. Other embodiments that are available to those having ordinary skills of the art without the expense of creative effort and endeavor are considered belonging to the scope of protection of the present invention.

Figure 1:
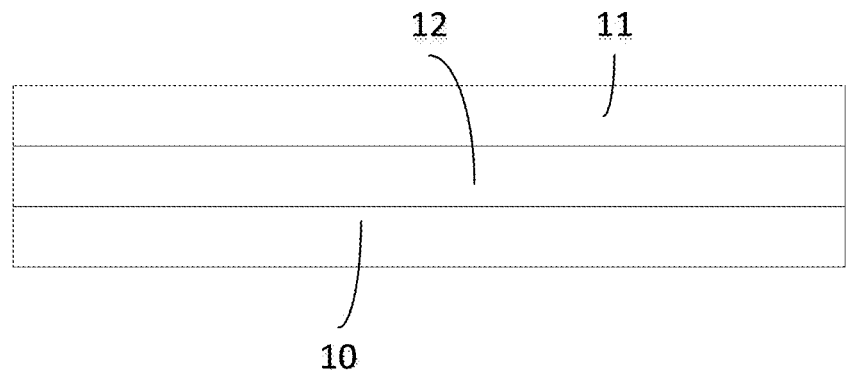
FIG. 1 is a side elevational view illustrating a liquid crystal display panel according to the present invention.
Figure 2:
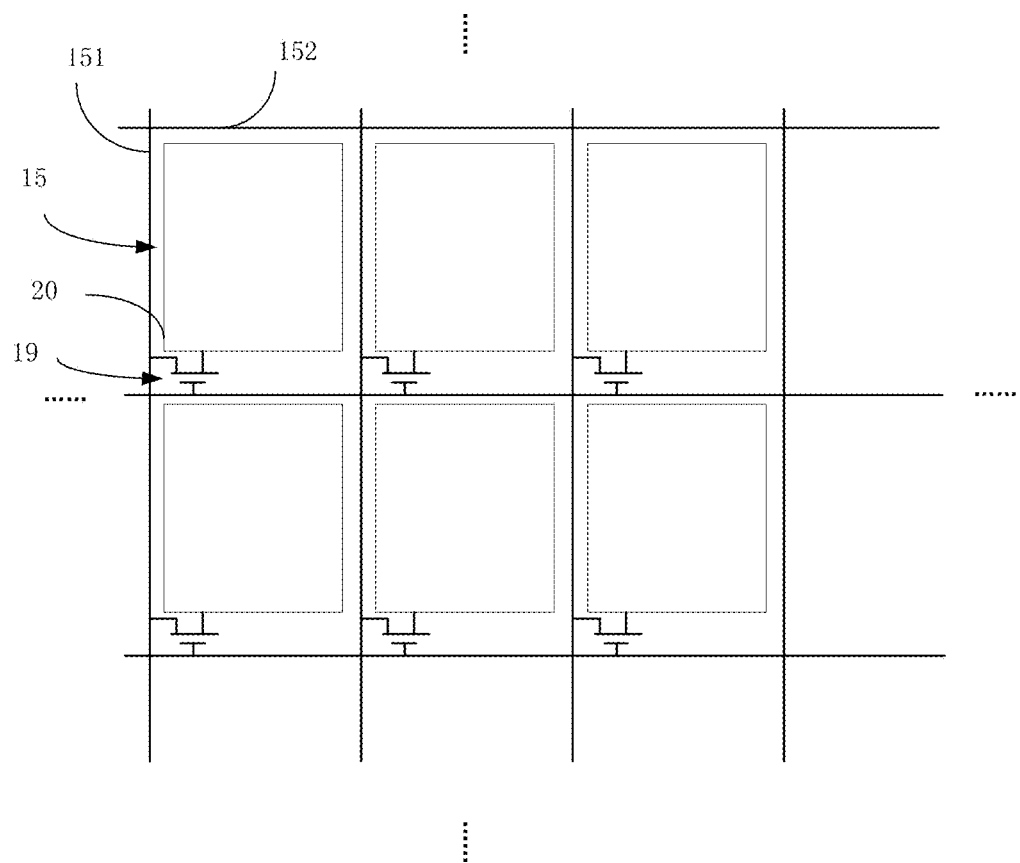
FIG. 2 is a schematic, top plan view illustrating a structure of the array substrate according to an embodiment of the present invention.

Referring to FIGS. 1 and 2, the present invention provides a liquid crystal display panel and a liquid crystal display device. The liquid crystal display device comprises a backlight module and the liquid crystal display panel. The backlight module provides light to the liquid crystal display panel. The liquid crystal display panel comprises an array substrate 10, a color filter substrate 11, and a liquid crystal layer 12 interposed between the array substrate 10 and the color filter substrate 11. The array substrate 10 and the color filter substrate 11 comprise multiple displaying components (not shown) mounted thereon and the multiple displaying component are arranged to generate an electric field that drives the liquid crystal layer 12 to carry out image displaying. The array substrate 10 comprises a plurality of scan lines 152 and a plurality of data lines 151 that are insulated from the scan lines. The scan lines 152 and the data lines 151 are arranged mutually perpendicular to each other to define a plurality of pixels 15 that are arranged in an array.

As shown in FIG. 2, a schematic view is provided to illustrate a layout arrangement of the array substrate 10, wherein the plurality of scan lines 152 and data lines 151 are respectively arranged in perpendicular directions and are spaced and insulated from each other; and correspondingly, the pixels 15 are each arranged two adjacent ones of the data lines 151 and two adjacent ones of the scan lines 152 and electrically connected to one of the data lines and one of the scan lines corresponding thereto. Each of the pixels 15 comprises, at least, a thin-film transistor 19 and a pixel electrode 20 connected to the thin-film transistor 19. For each of the pixels 15, the thin-film transistor 19 is electrically connected to the data line 151 and the scan line 152 corresponding thereto, and a separation zone 16 is formed between the pixel electrodes 20 of every two adjacent ones of the pixels 15, such that the thin-film transistor 19 and the scan line 152 are located in the separation zone 16.

The thin-film transistor 19 comprises a gate electrode that is formed on a surface of a base plate, a gate insulation layer set on and covering a surface of the gate electrode, and an active layer formed on a surface of the gate insulation layer, wherein the gate insulation layer forms electrical insulation between the active layer and the gate electrode. A source electrode and a drain electrode are formed on a surface of the active layer and spaced from each other by a predetermined distance, wherein the predetermined distance defines a conductive channel between the source electrode and the drain electrode. The base plate can be a transparent quartz plate, a glass plate, or a plastic plate. The pixel electrode 20 is made of indium tin oxide (ITO). The array substrate is formed with photolithography. The thin-film transistor 19 is selectively set in a conducting condition as being driven by a scan signal received, through the gate electrode, from the scan line 152, while a data signal of an image to be displayed is transmitted from the data line to the source electrode of the pixel and then transmitted through the drain electrode to the pixel electrode, such that the pixel electrode 20 is driven by the data signal to generate an electric field with respect to a reference voltage to thereby drive the liquid crystal layer to display an image of the data signal. The color filter substrate 11 has a surface that faces the array substrate 10 and comprises, formed thereon, a light shielding zone 17, which is specifically a black matrix.

Figure 3:
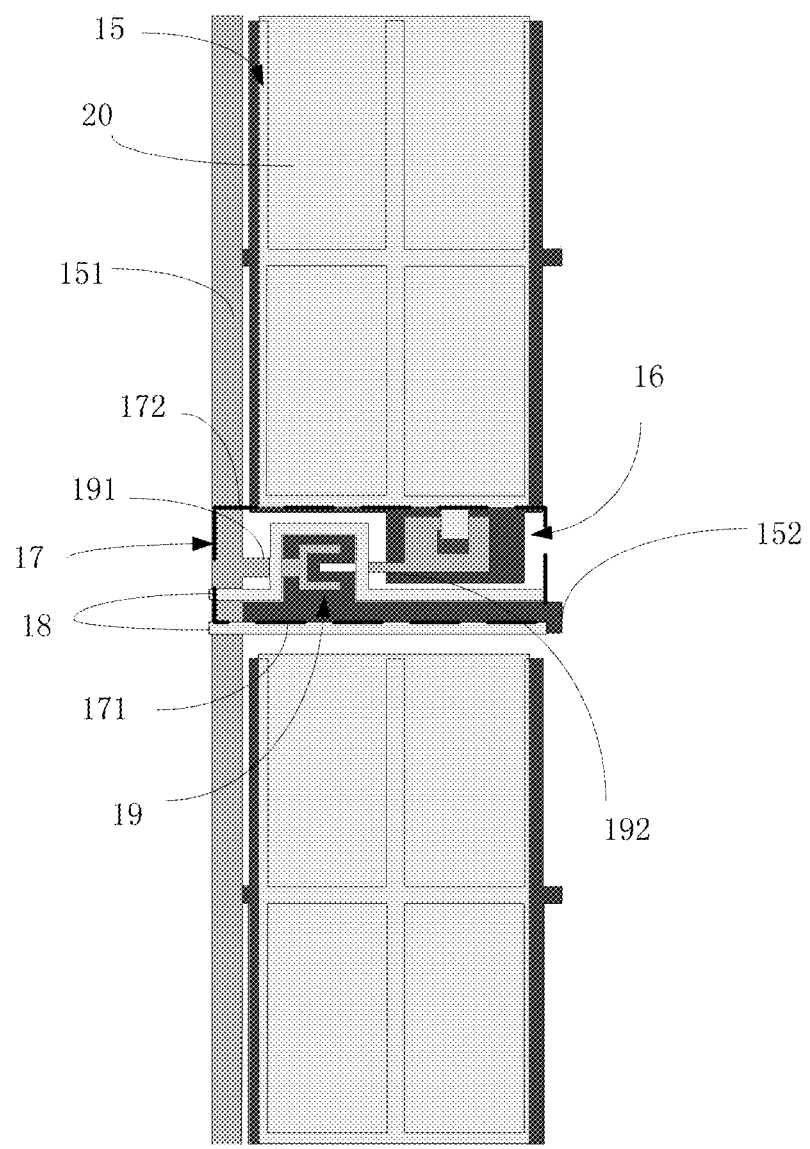
FIG. 3 is a schematic view illustrating a portion of the array substrate according to the embodiment of the present invention, the drawing being made as a see-through drawing, wherein an outer circumference of a light-shielding zone is represented with phantom lines.

As shown in FIG. 3, further, each of the separation zones 16 is provided with a transparent wiring line 18, and the separation zone 16 is partly light-transmittable. The transparent wiring line 18 has edges that cast projections on the plane on which the scan line 152 is located such to coincide with edges of the scan line 152, while a projection cast on the plane on which the scan line 152 is located by the transparent wiring line 18 is not coincident with the scan line 152. Each of the separation zones 16 corresponds to one of the pixel electrodes. The transparent wiring line 18 is arranged along an outer circumference of the scan line of the pixel 15 that corresponds to the transparent wiring line. The transparent wiring line is supplied with an electrical voltage that is a common voltage of the array substrate.

Specifically, the thin-film transistor 19 comprises a source electrode 191 and a drain electrode 192. The source electrode 191 is connected to the data line 151, and the drain electrode 192 is connected, through a via formed in the separation zone 16, to the pixel electrode 20. The light shielding zone 17 comprises a first edge 171 and a second edge 172 opposite to the first edge 171. For each of the pixels, the thin-film transistor 19 and the scan line 152 connected thereto are located in the separation zone 16 corresponding to the pixel electrode 20 thereof; and in the separation zone 16 of the pixel electrode 20, the transparent wiring line 18 is arranged to surround the scan line 152 of the pixel 15 but does not cover the scan line 152. Further, the first edge 171 of the light shielding zone 17 is located between the transparent wiring line 18 and one of the pixel electrodes 20 or is coincident with an edge of the transparent wiring line 20; and the second edge 172 of the light shielding zone 17 is coincident with an edge of another adjacent the pixel electrode 20 or spaced therefrom by a predetermined distance. The light shielding zone 17 shields the scan line 152 and the transparent wiring line 18. The light shielding zone 17 that shield the separation zone 16 corresponding to the pixel 15 is such that the first edge 171 thereof is located an outer side of the transparent wiring line 18 that faces the another pixel 15 adjacent thereto, wherein said anther pixel 15 is a pixel that is another one that is adjacent to the thin-film transistor of the pixel corresponding to the separation zone 16 and is not a pixel that is another one that is adjacent to the pixel electrode of the pixel corresponding to the separation zone 16. In other words, for the light shielding zone 17 that shields the separation zone 16 corresponding to the pixel electrode 20, the first edge 171 is located on an outer side of the transparent wiring line 18 that faces another pixel 15 adjacent thereto and defines a gap with respect to a pixel electrode of said another pixel and this increase the transparency of the separation zone, and the second edge 172 is located on a connection site between the pixel electrode 20 of the pixel and the separation zone 16.

In an alterative way, the first edge of the light shielding zone 17 is located on an edge of the scan line 152, and the second edge of the light shielding zone 17 is adjacent to or spaced from the pixel electrode 20 by a predetermined distance, such that the light shielding zone shields the scan line 152 and the thin-film transistor 15, and the light shielding zone 17 has an opening corresponding to the transparent wiring line 18 to expose the transparent wiring line 18. The opening of the light shielding zone 17 that is formed to correspond to the transparent wiring line 18 has a pattern that corresponds to a pattern of the transparent wiring line 18 and the opening has a size that is substantially equal to a size of the transparent wiring line 18 or is slightly smaller than the transparent wiring line 18.

Correspondingly, each of the pixels 15 is arranged between two adjacent ones of the data lines 151 and two adjacent ones of the scan lines 152. The thin-film transistor of each of the pixels 15 is electrically connected to one of the data lines 151 and one of the scan lines 152 corresponding thereto. The transparent wiring line 18 located in each of the separation zones 16 comprises two line segments and the scan line 152 that is located in the separation zone 16 is located between the two line segments of the transparent wiring line 18. For the same the separation zone 18, the two line segments of the transparent wiring line 18 are arranged along an outer circumference of the scan line 152 (including the gate electrode under the active layer) to surround the scan line 152 and connect with but not cover the scan line 152. The transparent wiring line 18 and the pixel electrode 20 are located on the same layer and are formed of the same material with the same operation process so that there is no need to add a manufacturing operation. The transparent wiring line 18 and the pixel electrode 20 are both formed of a tin-doped indium oxide (ITO) material. Of course, the transparent wiring line 18 and the pixel electrode 20 can be set at different layers.

Further, the liquid crystal display panel comprises a display zone and a peripheral zone (not shown). The two line segments of the transparent wiring line 18 of the same separation zone 16 do not intersect in the display zone and the two line segments of the transparent wiring line are connected in the peripheral zone. Further, the transparent wiring line 18 is supplied with an electrical voltage that is a common voltage of the array substrate 10.

Analysis of principle: when the display panel displays, the transparent wiring line is at the common voltage level and is the same voltage level as that of the electrode of the color filter substrate side so that the electric field between the substrates is 0 and the liquid crystal molecules do not rotate to thereby effectively shield influence caused on the display zone by variation of electrical voltage signal of the scan line to fix the liquid crystal located above the scan line at the site above the scan line and prevent it from affecting the display zone to cause abnormality of dark state displaying. With improvement achieved with such an arrangement, the shielding zone does not need to exceed the scan line by a distance of 10-12 µm, as required by the prior art, to cover an edge of the pixel electrode and can be retracted to the scan line to cover other non-display zone.

The present invention provides a liquid crystal display panel that comprises a transparent wiring line provided in a separation zone of an array substrate at a site thereof, which corresponds to a light shielding zone and in which a thin-film transistor is arranged, to surround a scan line of the separation zone, in the entirety thereof, and connect with the scan line, but not covering the scan line so that edges of the light shielding zone (the first edge and the second edge) are retracted to edge of metal (scan line) without shielding the pixel electrodes on two sides of the separation zone to thereby effectively increase the aperture ratio of the pixels. Since the transparent wiring line does not cover the scan line, parasitic capacitance generated between the transparent wiring line and the scan line is made small and does not increase loading of the scan line, while also ensure no light leaking in dark state displaying of the liquid crystal panel. Further, two segments of the transparent wiring line do not interact with the panel but connect to each other in an outer periphery of the panel and are supplied with a common voltage signal. Thus, inspection can be conducted through displaying with odd and even lines of pixels in case the transparent wiring line is shorted with an adjacent pixel electrode.

The above provides a disclosure related to the preferred embodiments of the present invention only and is not intended to limit the scope of the present invention. Equivalent variations made according to the appended claims of the application are considered falling within the scope covered by the present invention.

What is claimed is:
1. A liquid crystal display panel, comprising an array substrate, a color filter substrate, and a liquid crystal layer interposed between the array substrate and the color filter substrate, the array substrate comprising a plurality of scan lines and a plurality of data lines that are insulated from the scan lines, the scan lines and the data lines being arranged mutually perpendicular to each other to define a plurality of pixels that are arranged in an array, each of the pixels comprising, at least, a thin-film transistor and a pixel electrode connected to the thin-film transistor, the thin-film transistor of each of the pixels being connected to one of the data lines and one of the scan lines corresponding thereto, a separation zone being formed between adjacent ones of the pixel electrodes, the thin-film transistor and the scan line being arranged in the separation zone,
 wherein the pixels further comprise a transparent wiring line arranged along an outer circumference of the scan line, the transparent wiring line being supplied with an electrical voltage that is a common voltage of the array substrate;
 wherein the transparent wiring line comprises two line segments that extend completely through the separation zone and are spaced and separated from each other in the separation zone and the scan line is located between the two line segments of the transparent wring line in the separation zone; and wherein the two line segments of the transparent wiring line cast projections on a plane on which the scan line is located such that the projections are not coincident with the scan line with edges of the projections of the two line segments of the transparent wiring line coincident with two sides of the scan line and three sides of a gate electrode extended from the scan line, wherein the edges of the projections of the two line segments of the transparent wiring line that are coincident with the sides of the scan line extend along the sides of the scan line through the separation zone.

2. The liquid crystal display panel as claimed in claim 1, wherein the color filter substrate is provided thereon with a light shielding zone corresponding to the separation zone and the light shielding zone comprises a first edge and a second edge opposite to the first edge, the first edge of the light shielding zone being arranged at a location between the transparent wiring line and one of the pixel electrodes or coincident with an edge of the transparent wiring line, the second edge of the light shielding zone being coincident with an edge of another one of the pixel electrode adjacent thereto or spaced therefrom by a predetermined distance, the light shielding zone shielding the scan line and the transparent wiring line.

3. The liquid crystal display panel as claimed in claim 1, wherein the color filter substrate is provided thereon with a light shielding zone corresponding to the separation zone and the light shielding zone comprises a first edge and a second edge opposite to the first edge, the first edge of the light shielding zone being located at an edge of the scan line, the second edge of the light shielding zone being adjacent to or spaced from the pixel electrode by a predetermined distance, the light shielding zone shielding the scan line and the thin-film transistor, the light shielding zone comprising an opening corresponding to the transparent wiring line to expose the transparent wiring line.

4. The liquid crystal display panel as claimed in claim 3, wherein the opening of the light shielding zone that corresponds to the transparent wiring line has a pattern that corresponds to a pattern of the transparent wiring line and a size of the opening is identical to a size of the transparent wiring line or slightly smaller than the size of the transparent wiring line.

5. The liquid crystal display panel as claimed in claim 1, wherein the liquid crystal display panel comprises a display zone and a peripheral zone, and the two line segments of the transparent wiring line of the same separation zone do not intersect in the display zone and the two line segments of the transparent wiring line are connected in the peripheral zone.

6. The liquid crystal display panel as claimed in claim 1, wherein the transparent wiring line and the pixel electrode are located on the same layer and are formed with the same operation process.

7. A liquid crystal display device, comprising a backlight module and a liquid crystal display panel, the backlight module supplying light to the liquid crystal display panel, the liquid crystal display panel comprising an array substrate, a color filter substrate, and a liquid crystal layer interposed between the array substrate and the color filter substrate, the array substrate comprising a plurality of scan lines and a plurality of data lines that are insulated from the scan lines, the scan lines and the data lines being arranged mutually perpendicular to each other to define a plurality of pixels that are arranged in an array, each of the pixels comprising, at least, a thin-film transistor and a pixel electrode connected to the thin-film transistor, the thin-film transistor of each of the pixels being connected to one of the data lines and one of the scan lines corresponding thereto, a separation zone being formed between adjacent ones of the pixel electrodes, the thin-film transistor and the scan line being arranged in the separation zone, wherein the pixels further comprise a transparent wiring line arranged along an outer circumference of the scan line, the transparent wiring line being supplied with an electrical voltage that is a common voltage of the array substrate;

wherein the transparent wiring line comprises two line segments that extend completely through the separation zone and are spaced and separated from each other in the separation zone and the scan line is located between the two line segments of the transparent wiring line in the separation zone; and wherein the two line segments of the transparent wiring line cast projections on a plane on which the scan line is located such that the projections are not coincident with the scan line with edges of the projections of the two line segments of the transparent wiring line coincident with two sides of the scan line and three sides of a gate electrode extended from the scan line, wherein the edges of the projections of the two line segments of the transparent wiring line that are coincident with the sides of the scan line extend along the sides of the scan line through the separation zone.

8. The liquid crystal display device as claimed in claim 7, wherein the color filter substrate is provided thereon with a light shielding zone corresponding to the separation zone and the light shielding zone comprises a first edge and a second edge opposite to the first edge, the first edge of the light shielding zone being arranged at a location between the transparent wiring line and one of the pixel electrodes or coincident with an edge of the transparent wiring line, the second edge of the light shielding zone being coincident with an edge of another one of the pixel electrode adjacent thereto or spaced therefrom by a predetermined distance, the light shielding zone shielding the scan line and the transparent wiring line.

9. The liquid crystal display device as claimed in claim 7, wherein the color filter substrate is provided thereon with a light shielding zone corresponding to the separation zone and the light shielding zone comprises a first edge and a second edge opposite to the first edge, the first edge of the light shielding zone being located at an edge of the scan line, the second edge of the light shielding zone being adjacent to or spaced from the pixel electrode by a predetermined distance, the light shielding zone shielding the scan line and the thin-film transistor, the light shielding zone comprising an opening corresponding to the transparent wiring line to expose the transparent wiring line.

10. The liquid crystal display device as claimed in claim 9, wherein the opening of the light shielding zone that corresponds to the transparent wiring line has a pattern that corresponds to a pattern of the transparent wiring line and a size of the opening is identical to a size of the transparent wiring line or slightly smaller than the size of the transparent wiring line.

11. The liquid crystal display device as claimed in claim 7, wherein the liquid crystal display panel comprises a display zone and a peripheral zone, and the two line segments of the transparent wiring line of the same separation zone do not intersect in the display zone and the two line segments of the transparent wiring line are connected in the peripheral zone.

12. The liquid crystal display device as claimed in claim 7, wherein the transparent wiring line and the pixel electrode are located on the same layer and are formed with the same operation process.

* * * * *